United States Patent
Francus et al.

(10) Patent No.: US 11,858,321 B1
(45) Date of Patent: Jan. 2, 2024

(54) VEHICLE SUNVISOR ASSEMBLY

(71) Applicant: NISSAN NORTH AMERICA, INC., Franklin, TN (US)

(72) Inventors: Neil Andrew Francus, Plymouth, MI (US); David Smolik, Windsor (CA)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/836,485

(22) Filed: Jun. 9, 2022

(51) Int. Cl.
*B60J 3/02* (2006.01)

(52) U.S. Cl.
CPC ................................. *B60J 3/0217* (2013.01)

(58) Field of Classification Search
CPC ........................................................ B60J 3/023
See application file for complete search history.

(56) References Cited

U.S. PATENT DOCUMENTS

| | | | |
|---|---|---|---|
| 2,112,464 | A | 3/1938 | Jacobs |
| 2,454,613 | A | 11/1948 | Feltier et al. |
| 2,646,241 | A | 7/1953 | Mclean |
| 3,017,217 | A | 1/1962 | Keating |
| 3,374,031 | A | 3/1968 | Dully |
| 3,767,256 | A | 10/1973 | Sarkees |
| 6,547,308 | B2 | 4/2003 | Hamelink et al. |
| 10,988,003 | B2 * | 4/2021 | Baxter ............... B60J 3/023 |

FOREIGN PATENT DOCUMENTS

| | | | | |
|---|---|---|---|---|
| JP | 4465099 | B2 * | 5/2010 | .............. B60J 3/023 |
| KR | 920004596 | | * 6/1992 | |

OTHER PUBLICATIONS

English language translation of abstract JP 4465099 (Year: 2010).*
English language translation of KR 920004596 (Year: 1992).*

* cited by examiner

*Primary Examiner* — Joseph D. Pape
(74) *Attorney, Agent, or Firm* — Global IP Counselors, LLP

(57) ABSTRACT

A vehicle sunvisor assembly includes a sunvisor panel and an energy absorbing structure. The sunvisor panel has a first end and a second attachment end. The first end is supported to a vehicle for pivotal movement about an upright axis and movement about an offset axis that is not parallel to the upright axis. The energy absorbing structure is installed to the vehicle. The energy absorbing structure has a downwardly extending projection with a second attachment end that aligns with the first attachment end such that with the first attachment end of the sunvisor panel pivoted to the second attachment end, the first attachment end releasably attaches to the second attachment end. The energy absorbing structure is configured to pivot upward in response to an object contacting the sunvisor panel, transferring forward momentum to the second attachment end and to the energy absorbing structure.

14 Claims, 8 Drawing Sheets

VEHICLE SUNVISOR ASSEMBLY

BACKGROUND

Technical Field

The present disclosure generally relates to vehicle sunvisor assembly. More specifically, the present disclosure relates to vehicle sunvisor assembly that includes an energy absorbing structure that absorbs forward momentum (energy) in response to an object moving in a forward direction contacting a sunvisor panel imparting the forward momentum through the sunvisor panel to the energy absorbing structure.

Background Information

The automotive industry is constantly re-engineering and re-designing many of the components and structures within a vehicle in order to absorb energy in the form of forward momentum of objects within the vehicle. One area of re-designing interest relates to considering the effects of a sudden stop or impact event on very tall vehicle operators or tall passengers within a vehicle.

SUMMARY

One object of the present disclosure is to provide a sunvisor assembly with an energy absorbing structure that cushions or absorbs energy (forward momentum) from an object aligned with the sunvisor assembly.

In view of the state of the known technology, one aspect of the present disclosure is to provide a vehicle sunvisor assembly with a support structure, a sunvisor panel and an energy absorbing structure. The support structure is attached to a vehicle body structure adjacent to a first area of a windscreen of the vehicle body structure. The sunvisor panel has a first end and a second end. The first end is supported by the support structure for pivotal movement about an upright axis and movement about an offset axis that is not parallel to the upright axis. The second end of the sunvisor panel has a first attachment end. The energy absorbing structure is installed to the vehicle body structure adjacent to a second area of the windscreen spaced apart from the first area. The energy absorbing structure has a downwardly extending projection with a second attachment end that aligns with the first attachment end such that with the first attachment end of the sunvisor panel pivoted to the second attachment end, the first attachment end releasably attaches to the second attachment end. The energy absorbing structure is configured to absorb energy and pivot upward and forward in response to an object contacting and moving the sunvisor panel in a forward direction, transferring movement energy to the second attachment end and to the energy absorbing structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
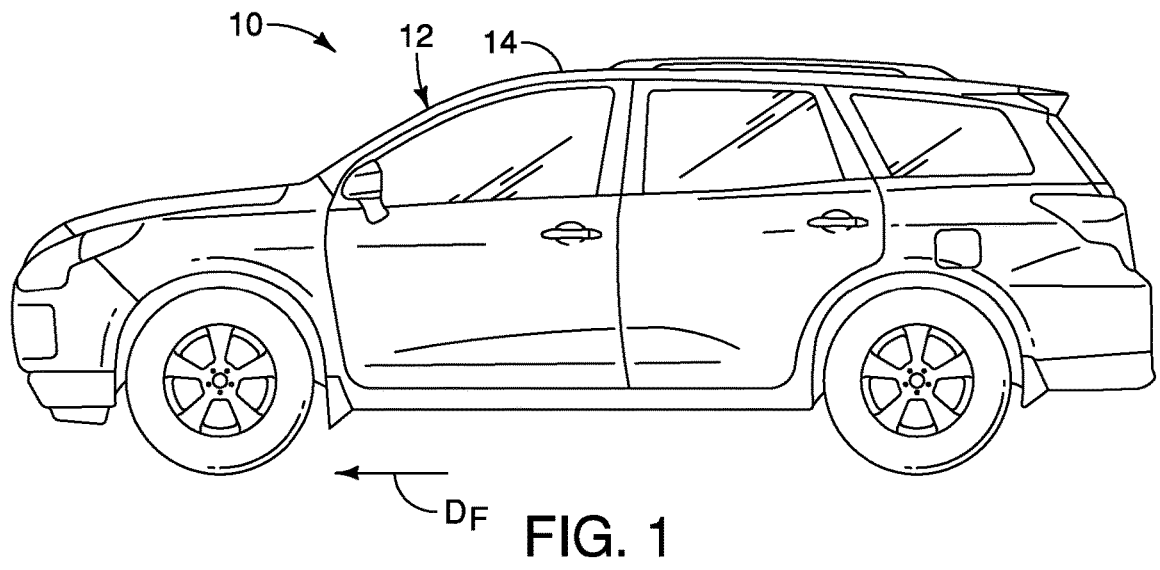
FIG. 1 is a side view of a vehicle in accordance with a first embodiment.
Figure 2:
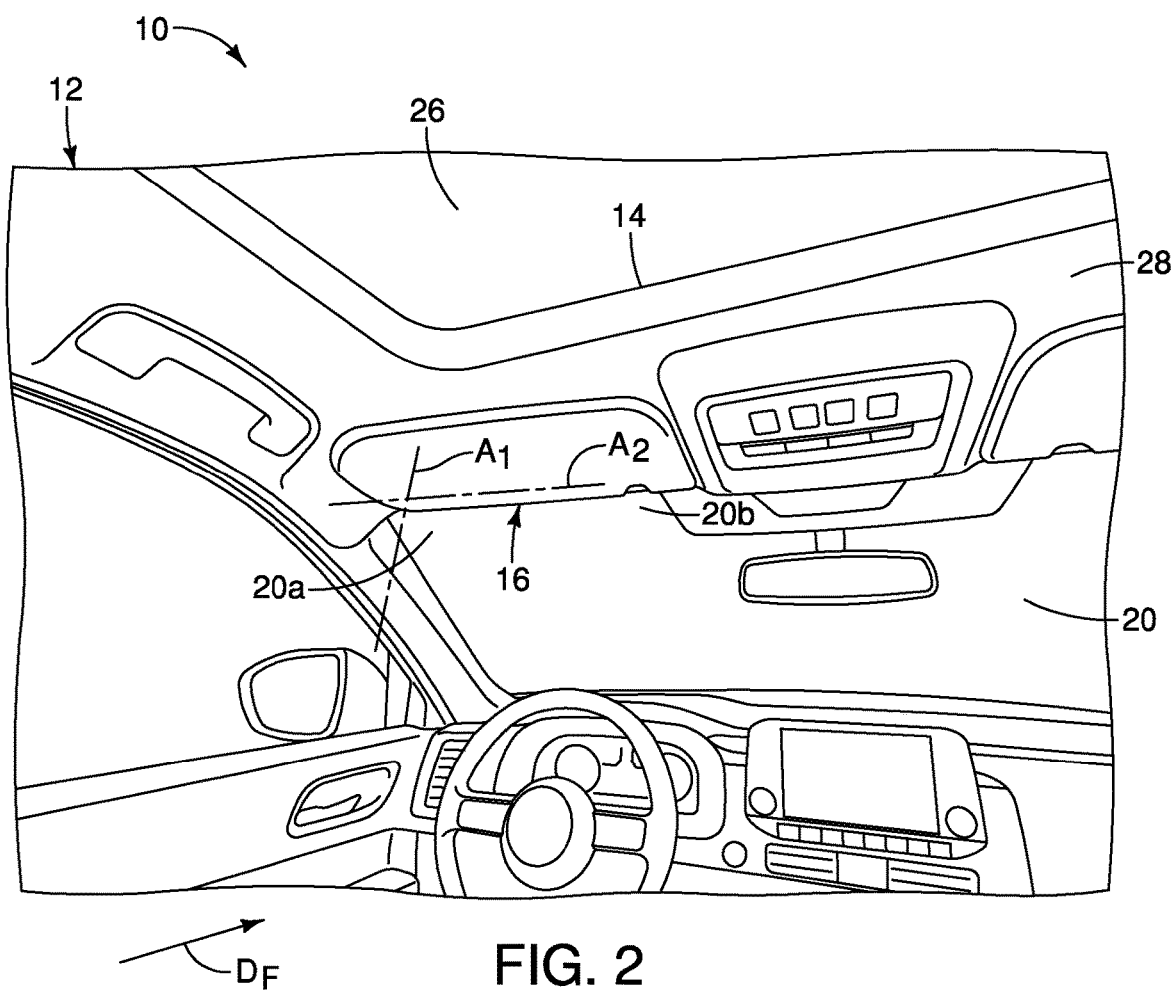
FIG. 2 is a view of an interior portion of the vehicle showing a windscreen, instrument panel, steering wheel, a headliner, a roof structure and a vehicle sunvisor assembly in accordance with the first embodiment.

Referring initially to FIGS. 1 and 2, a vehicle 10 having a vehicle body structure 12 that includes a roof structure 14 and a sunvisor assembly 16 is illustrated in accordance with a first embodiment.

The vehicle 10 defines a vehicle forward direction $D_F$. The vehicle body structure 12 includes many conventional features, such as doors 18 and a windscreen 20 made of a laminated glass material. Since doors and windscreens are conventional vehicle structures and components, further description is omitted for the sake of brevity.

Figure 5:
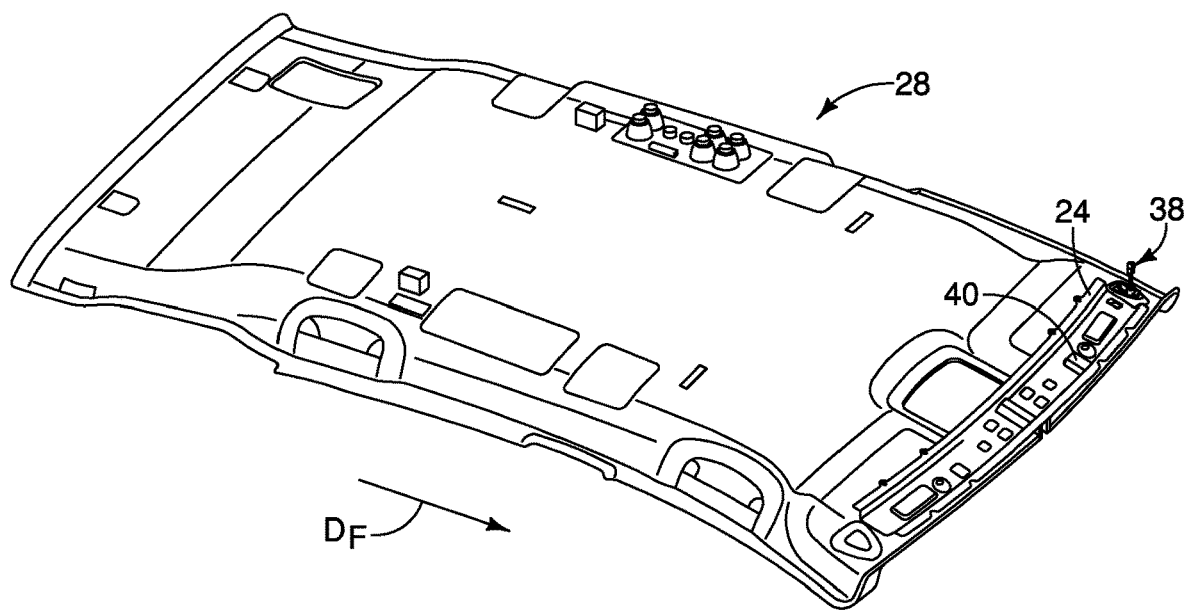
FIG. 5 is a perspective view of the headliner removed from the vehicle showing the energy absorbing structure and the support structure of the sunvisor assembly installed to an upper surface of the headliner in accordance with the first embodiment.
Figure 6:
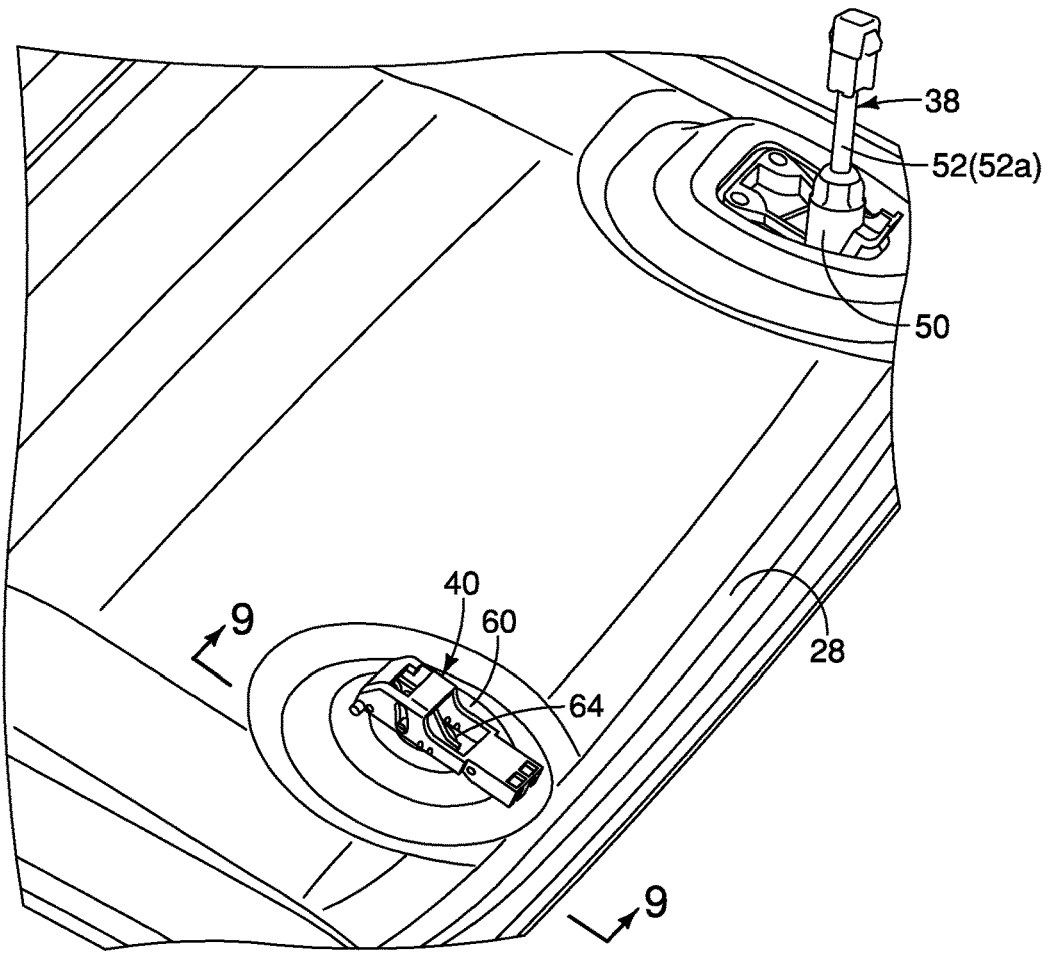
FIG. 6 is a perspective view of a portion of the headliner depicted in FIG. 5 further showing the energy absorbing structure and the support structure of the sunvisor assembly in accordance with the first embodiment.
Figure 7:
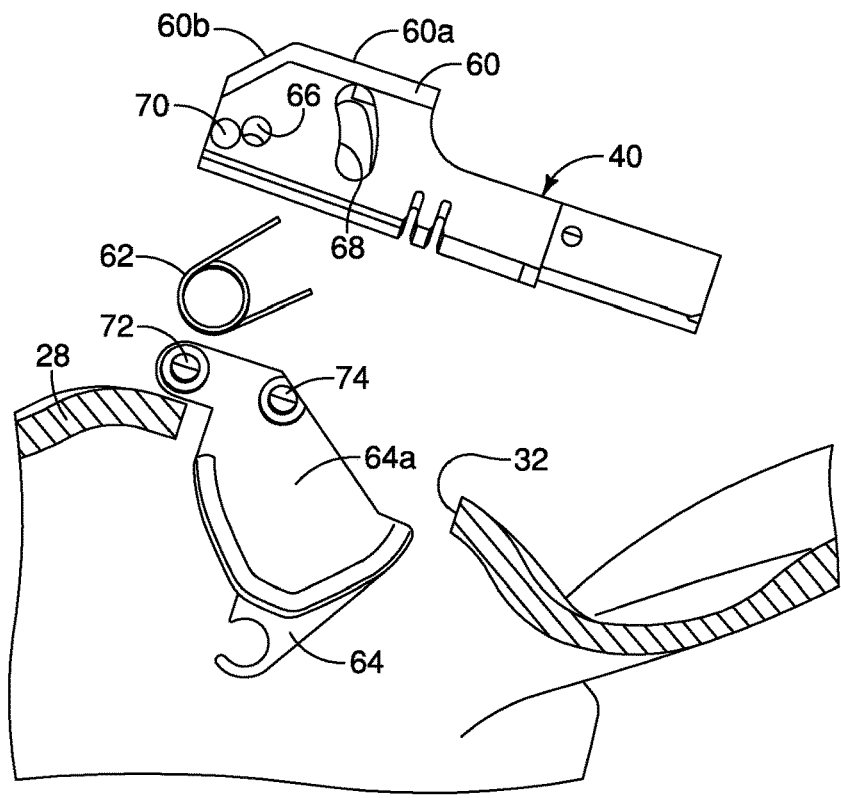
FIG. 7 is a side exploded view of the portion of the headliner showing a housing, a biasing member and a downwardly extending projection of the energy absorbing structure of the sunvisor assembly in accordance with the first embodiment.
Figure 8:
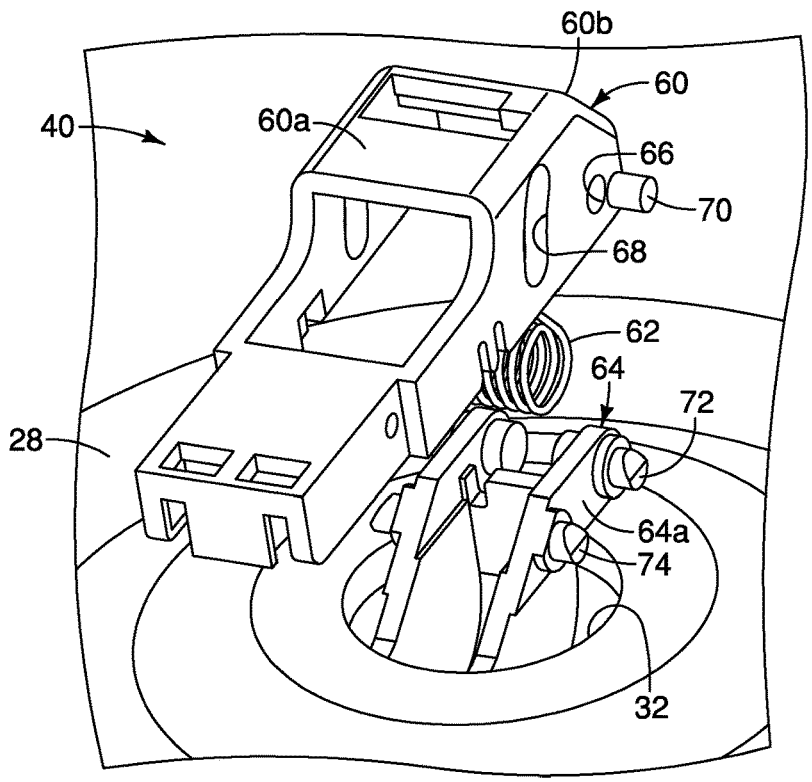
FIG. 8 is a top perspective view of the portion of the headliner depicted in FIG. 7 showing the housing, the biasing spring and an upper portion of the downwardly extending projection of the energy absorbing structure in accordance with the first embodiment.

As shown in FIGS. 2-3, 5 and 6, the roof structure 14 includes a roof panel assembly 22, a plurality of roof bows (with only a forward roof bow 24 shown in FIGS. 3, 5 and 6), an optional sunroof 26 and a headliner 28 that conceals the roof bows such as the forward roof bow 24 and roof panel assembly 22 from view within a passenger compartment within the vehicle body structure 12. As shown in FIG. 5, the forward roof bow 24 extends from side-to-side within the roof structure 14 adjacent to the windscreen 20 (also referred to as a windshield). The headliner 28 is installed along an interior side of the roof structure 14. As shown in FIGS. 7 and 8, the headliner 28 includes an elongated slot 32, as described further herein below.

The sunvisor assembly 16 (also referred to as the vehicle sunvisor assembly 16) is now described with reference to FIGS. 2, 3 and 4. The sunvisor assembly 16 includes a sunvisor panel 36, a support structure 38 and an energy absorbing structure 40.

Figure 3:
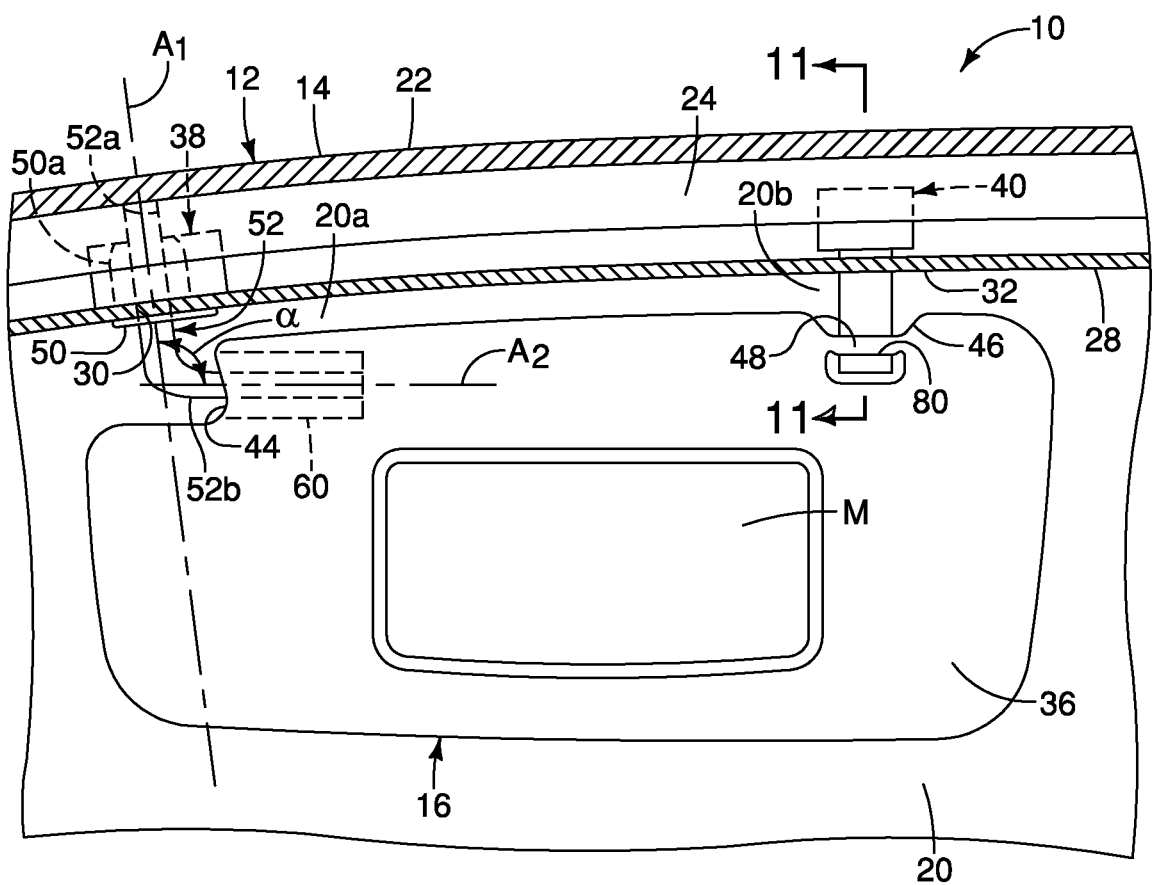
FIG. 3 is a rear cross-sectional view of a roof structure of the vehicle showing details of a support structure and an energy absorbing structure of the sunvisor assembly in accordance with the first embodiment.
Figure 4:
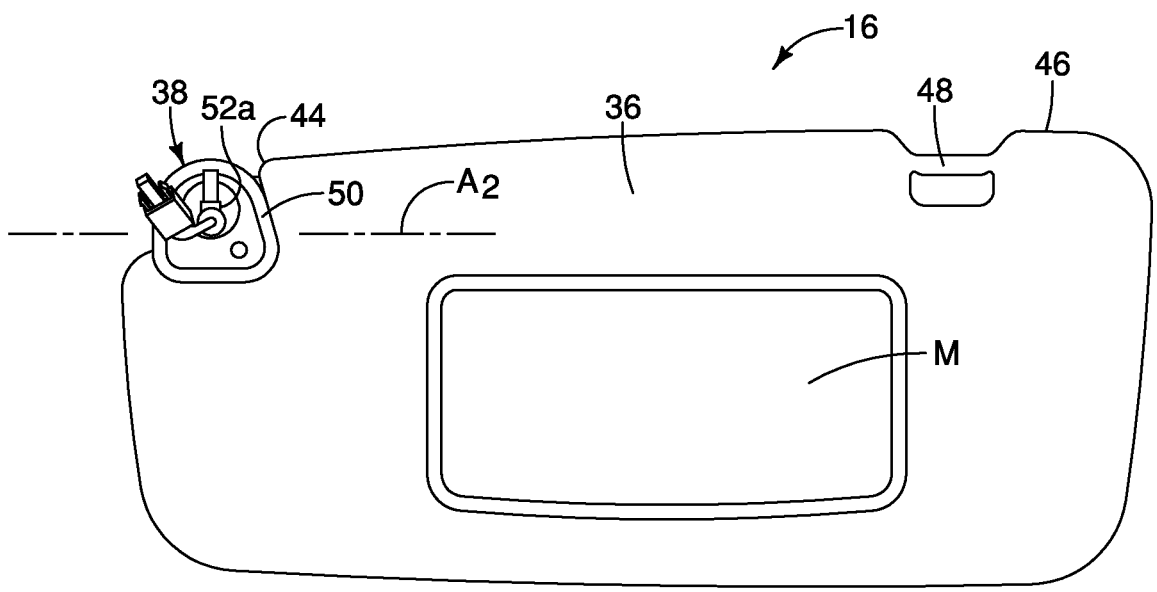
FIG. 4 is rear view of the sunvisor assembly removed from the vehicle showing a first end and a second end of a sunvisor panel of the sunvisor assembly in accordance with the first embodiment.

As shown in FIGS. 3 and 4, the sunvisor panel 36 is a generally rectangular shaped element covered with a durable, decorative material. The sunvisor panel 36 can include a vanity mirror M and/or light (not shown). The sunvisor panel 36 defines a first end 44 and a second end 46. The sunvisor panel 36 with the support structure 38 are dimensioned and constructed to undergo pivotal movement an upright axis $A_1$, as described below. The first end 44 is a shaft receiving end that is further dimensioned and constructed to undergo pivotal movement about an offset axis $A_2$ that is not parallel to the upright axis $A_1$, as is also described in greater detail below. The second end 46 includes or defines a first attachment end 48 that is also described in greater detail below.

The support structure 38 of the sunvisor assembly 16 includes a base member 50 and an L-shaped shaft 52. The base member 50 is attached to at least the headliner 28 and the forward roof bow 24 via a snap-fitting structure (not shown) and/or a fastener (not shown). The base member 50 also includes a shaft support portion 50a (also referred to as a first shaft receiving section 50a). An upper portion of the shaft support portion 50a of the base member 50 is also attach to the forward roof bow 24 of the vehicle body structure 12 Specifically, as shown in FIGS. 2 and 3, the support structure 38 is attached to the forward roof bow 24 of the vehicle body structure 12 at a location that is adjacent to a first area 20a of a windscreen 20 of the vehicle body structure 12.

As shown in FIG. 3, the L-shaped shaft 52 has a first portion 52a and a second portion 52b. The first portion 52a extends through the support structure 38 and is supported therein for pivotal movement about the upright axis $A_1$. The upright axis $A_1$ does not need to be vertical, but can be slightly inclined relative to vertical, depending upon the overall shape and design of the vehicle body structure 12 of the vehicle 10. In the depicted embodiment, the upright axis $A_1$ is included relative to vertical by an angle that is approximately 5 degrees relative to vertical but can be anywhere between 0 and 10 degrees.

The second portion 52b of the L-shaped shaft member 50 along with the first end 44 of the sunvisor panel 36 define the offset axis $A_2$ such that the sunvisor panel 36 pivots about the offset axis $A_2$ and the second portion 52b of the L-shaped shaft member 52.

The first portion 52a and the second portion 52b of the L-shaped shaft member 52 define an angle α therebetween that is between 80 and 100 degrees. However, in the depicted embodiment, the angle α is approximately 90 degrees or can be slightly larger than 90 degrees, depending upon the design of the vehicle body structure 12 of the vehicle 10.

The first portion 52a of the L-shaped shaft member 52 extends through the base member 50 and into the shaft support portion 50a of the support structure 38. The upright axis $A_1$ is defined by the first shaft receiving section 50a with the first portion 52a of the L-shaped shaft 52 being retained within the first shaft receiving section 50a for pivotal movement in a conventional manner.

The second portion 52b of the L-shaped shaft member 52 extends into an opening (not shown) in the first end 44 of the sunvisor panel 36 and into a second shaft receiving section 60 of the sunvisor panel 36, as shown in phantom in FIG. 3.

Hence, the sunvisor panel 36 can undergo pivotal movement about the offset axis $A_2$ via the attachment to the second portion 52b of the L-shaped shaft 52.

In the depicted embodiment, the first attachment end 48 at the second end 46 of the sunvisor panel 36 is a pivot pin (hereinafter the pivot pin 48) that can be aligned with the offset axis $A_2$. In the depicted embodiment, the pivot pin 48 is separate and spaced apart from the second portion 52b of the L-shaped shaft member 52. More specifically, in the depicted embodiment, the second portion 52b is formed of a plastic or polymer material and is formed unitarily with the sunvisor panel 36.

However, in a first alternative embodiment (not shown) the pivot pin 48 can be part of the L-shaped shaft member 52 and is a distal end of the second portion 52b of the L-shaped shaft 52. Still further, in a further alternative embodiment, the pivot pin 48 is separate from the L-shaped shaft member 52 and is not aligned with the second axis $A_2$.

A description of the energy absorbing structure 40 is now provided with specific reference to FIGS. 3-12. The energy absorbing structure 40 installed to the vehicle body structure 12 adjacent to a second area 20b of the windscreen 20 spaced apart from the first area 20a, as shown in FIG. 2.

As shown in FIGS. 7 and 8, the energy absorbing structure 40 includes a housing 60, a biasing member 62 within the housing 60 and a downwardly extending projection 64. The downwardly extending projection 64 has an upper portion 64a.

Figure 9:
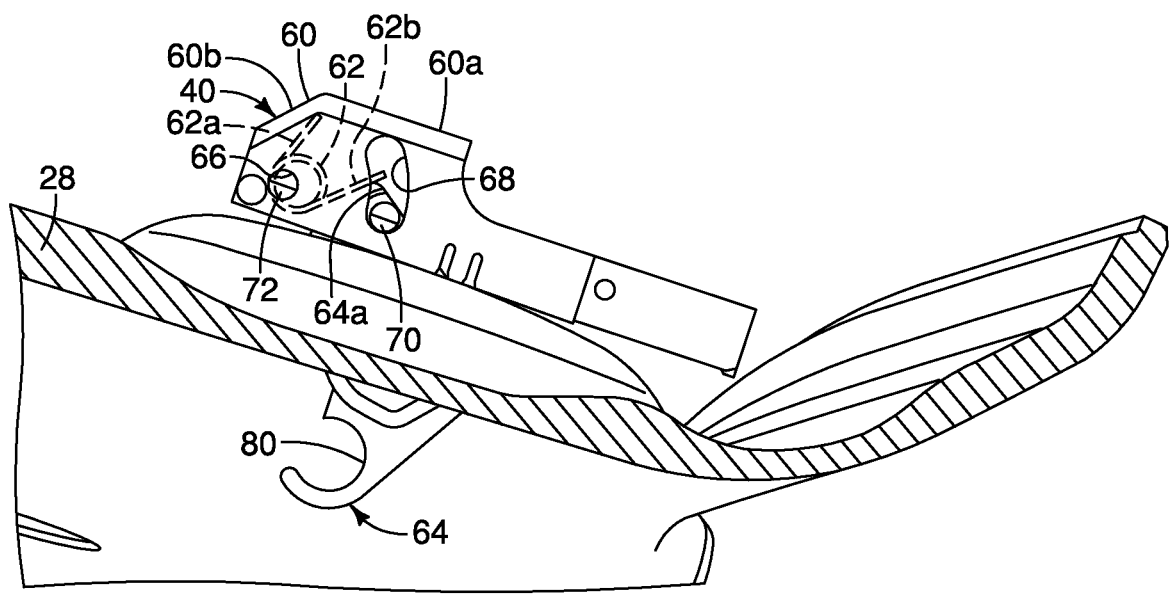
FIG. 9 is a cross-sectional view of the energy absorbing structure taken along the line 9-9 in FIG. 6 showing the housing attached to the headliner with a portion of the downwardly extending projection of the energy absorbing structure extending below the headliner in accordance with the first embodiment.
Figure 10:
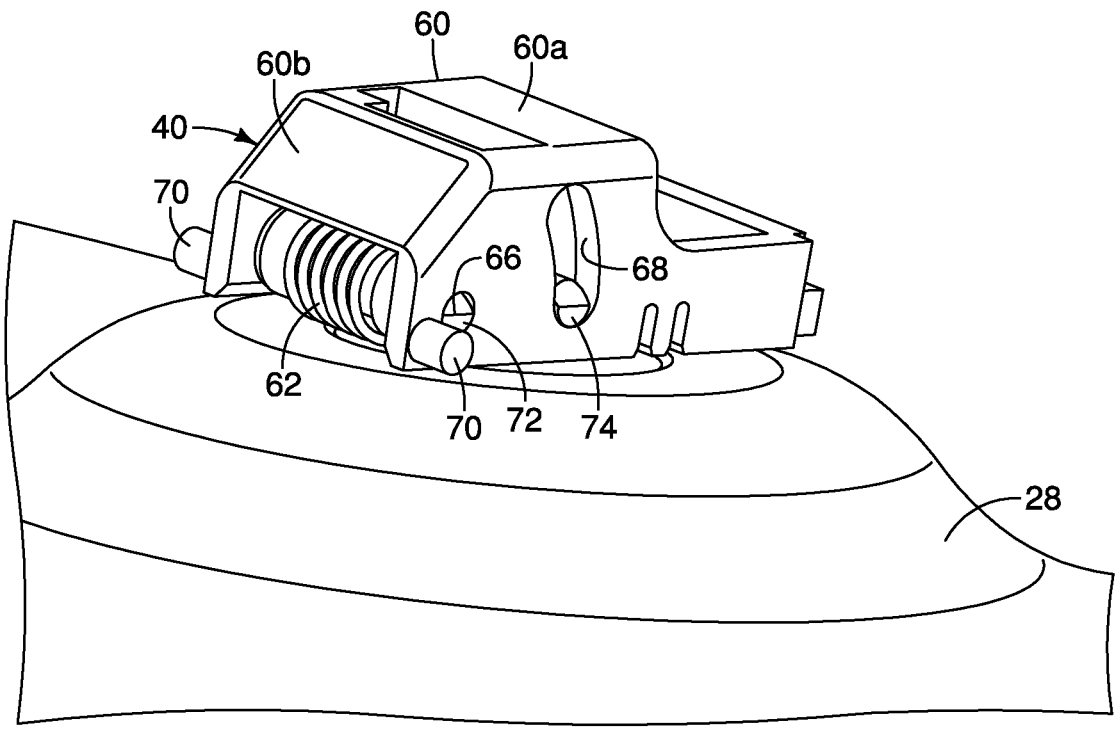
FIG. 10 is a perspective view of an upper surface of the headliner showing the housing of the energy absorbing structure attached thereto in accordance with the first embodiment.

As shown in FIGS. 3 and 5, the housing 60 is attached to the headliner 28 and the forward roof bow 24. The housing 60 has an overall rectangular shape and is closed on lateral, forward and rearward sides, and has a partially open top and open bottom, as shown in FIGS. 6, 8 and 9. The bottom area of the housing 60 includes an opening with the downwardly extending projection 64 extending downwardly therethrough. As shown in FIGS. 7-12, a portion of the housing 60 includes a first upper wall portion 60a and a second upper wall portion 60b. Side walls of the housing 60 include pivot openings 66, movement limiting slots 68 and pivot protrusions 70.

The pivot openings 66 are dimensioned and located at opposing sides of the housing 60 to the receive and retain pivot pins 72 formed on opposing sides of the upper portion 64a of the downwardly extending projection 64. The upper portion 64a of the downwardly extending projection 64 further includes movement limiting pins 74 that extend into the movement limiting slots 68 when the downwardly extending projection 64 is installed to the housing 60. There are two pivot openings 66 and two corresponding pivot pins 72. Similarly, there are two movement limiting slots 68 and two movement limiting pins 74. The downwardly extending projection 64 can pivot about the pivot pins 72 which pivot within the pivot openings 66. The amount of pivoting movement that the downwardly extending projection 64 can undergo is limited by the arcuate length of the movement limiting slots 68. Specifically, the pivoting movement of the downwardly extending projection 64 is limited by restriction of movement of the pivot protrusions 70 within the arcuately shaped movement limiting slots 68.

As shown in FIG. 9, the biasing member 62 is a coil spring (shown in phantom) with one end 62a contacting and being confined by the second upper wall portion 60b. A second end 62b of the biasing member 62 contacts the upper end 64a of the downwardly extending projection 64 urging the downwardly extending projection 64 downward and rearward relative to the range of pivoting movement relative to the housing 60.

Figure 11:
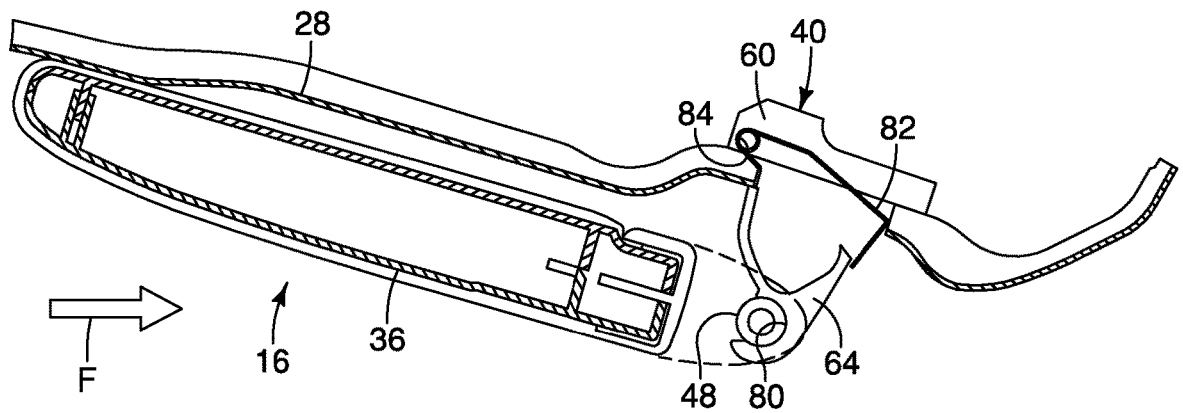
FIG. 11 is a cross-sectional view of a portion of the sunvisor assembly and the headliner taken along the line 11-11 in FIG. 3 showing further details of the energy absorbing structure with the biasing member urging the downwardly extending projection in an at rest orientation the in accordance with the first embodiment.
Figure 12:
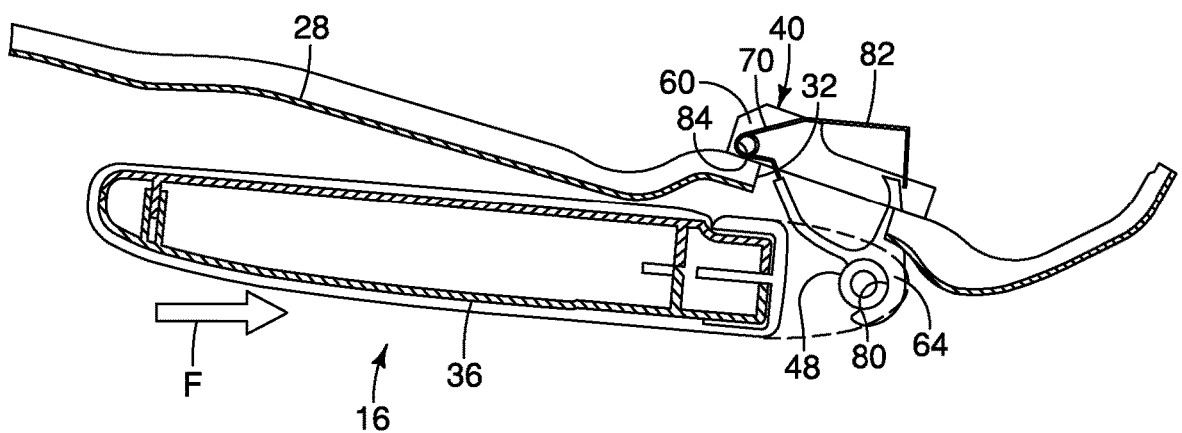
FIG. 12 is another cross-sectional view of the energy absorbing structure similar to FIG. 11 showing downwardly extending projection pivoted forward and upward in response to contact with an object in motion, the object and the force or momentum of the object represented by an arrow in accordance with the first embodiment.

As shown in FIGS. 9, 11 and 12, the downwardly extending projection 64 extends through the elongated slot 32 in the headliner 28 and includes a second attachment end 80. In the depicted embodiments, the second attachment end 80 is a slot that is dimensioned and shaped to receive the first attachment end 48 (pivot pin 48) in a releasable snap-fitting connection.

In the depicted embodiment, the second attachment end 80 of the downwardly extending projection 64 is a slot 80. The second attachment end 80 (the slot 80) is dimensioned and located such that the second attachment end 80 (the slot 80) defined proximate a lower end of the downwardly extending projection 64 is below the headliner 28 and is spaced apart from the headliner 28. In an at rest orientation shown in FIG. 11, the second attachment end 80 (slot 80) can easily receive the first attachment end 48 of the sunvisor panel 36. More specifically, the first attachment end 48 (pivot pin 48) can easily be snap-fitted into the second attachment end 80, in a conventional manner. In other words, the first attachment end 48 has an outer diameter that is slightly larger than the vertical height of the second attachment end 80 (the slot 80). A small amount of force is required to snap-fit the first attachment end 48 into the second attachment end 80 and remove the first attachment end 48 from the second attachment end 80.

The upper end 64a of the downwardly extending projection 64 is substantially located within the housing 60 such that the downwardly extending projection 64 can pivot about the pivot pins 62 and the pivot openings 66 of the housing 60.

As shown in FIG. 11, the biasing member 62 urges the downwardly extending projection 64 toward an at rest orientation. FIG. 12 shows the downwardly extending projection 64 during a sudden change in momentum where an object F contacts the sunvisor panel 36 pushing the sunvisor panel 36 forward. The momentum or force associated with rapid forward movement of the object F causes the downwardly extending projection 64 to move forward and upward as it pivots about the pivot openings 66 in the housing 60, thereby compressing or putting force on the biasing member 62 (spring 62), as shown in FIG. 12. Once the object F moves rearward, the biasing member 62 urges the downwardly extending projection 64 to return to the at rest orientation depicted in FIG. 11.

The energy absorbing structure 40 can also include a shield member 82 that covers those portions of the elongated slot 32 of the headliner 28 that might be exposed during movement of the downwardly extending projection 64, as shown in FIGS. 11 and 12. The shield member 82 includes openings that engage the pivot protrusions 70 of the housing 60, as shown in FIGS. 11 and 12. The shield member 82 basically pivots relative to the housing as the downwardly extending projection 64 pivots.

Second Embodiment

Referring now to FIGS. 13-16 a sunvisor assembly 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 13:
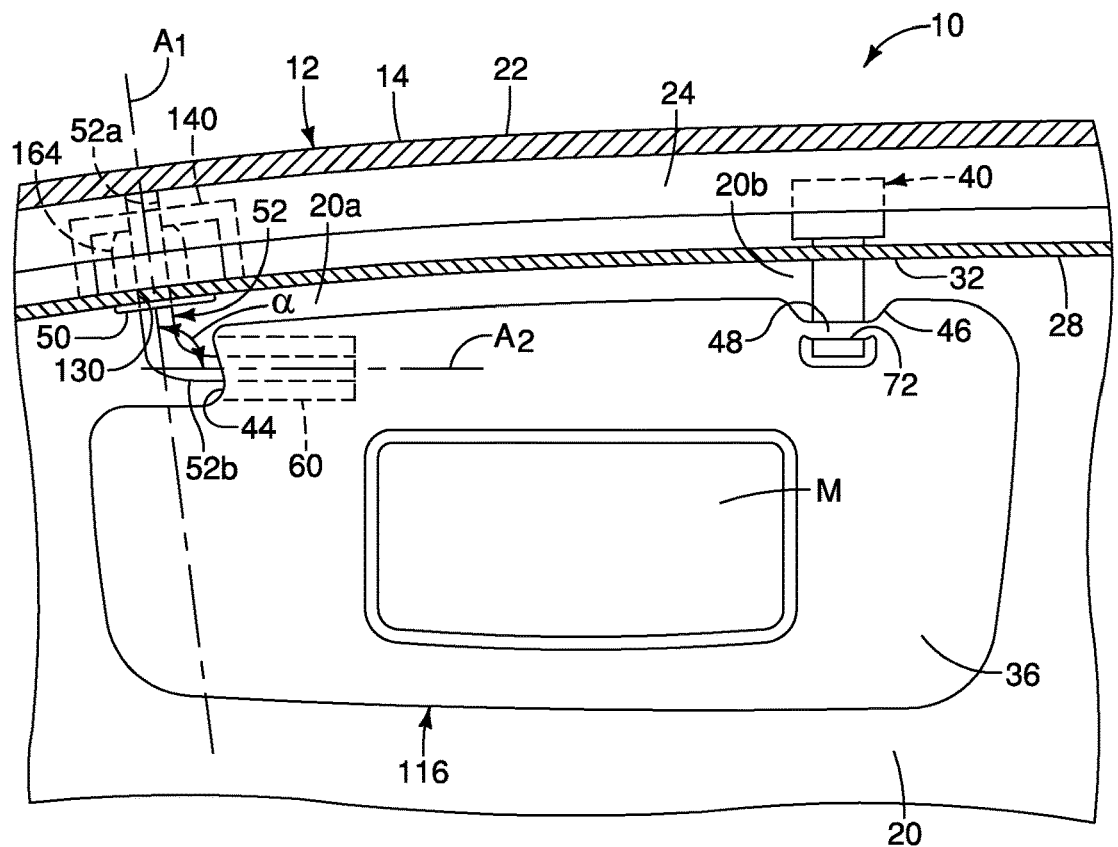
FIG. 13 is a rear cross-sectional view of a roof structure of the vehicle showing details of a support structure and a second energy absorbing structure of a sunvisor assembly in accordance with a second embodiment.
Figure 14:
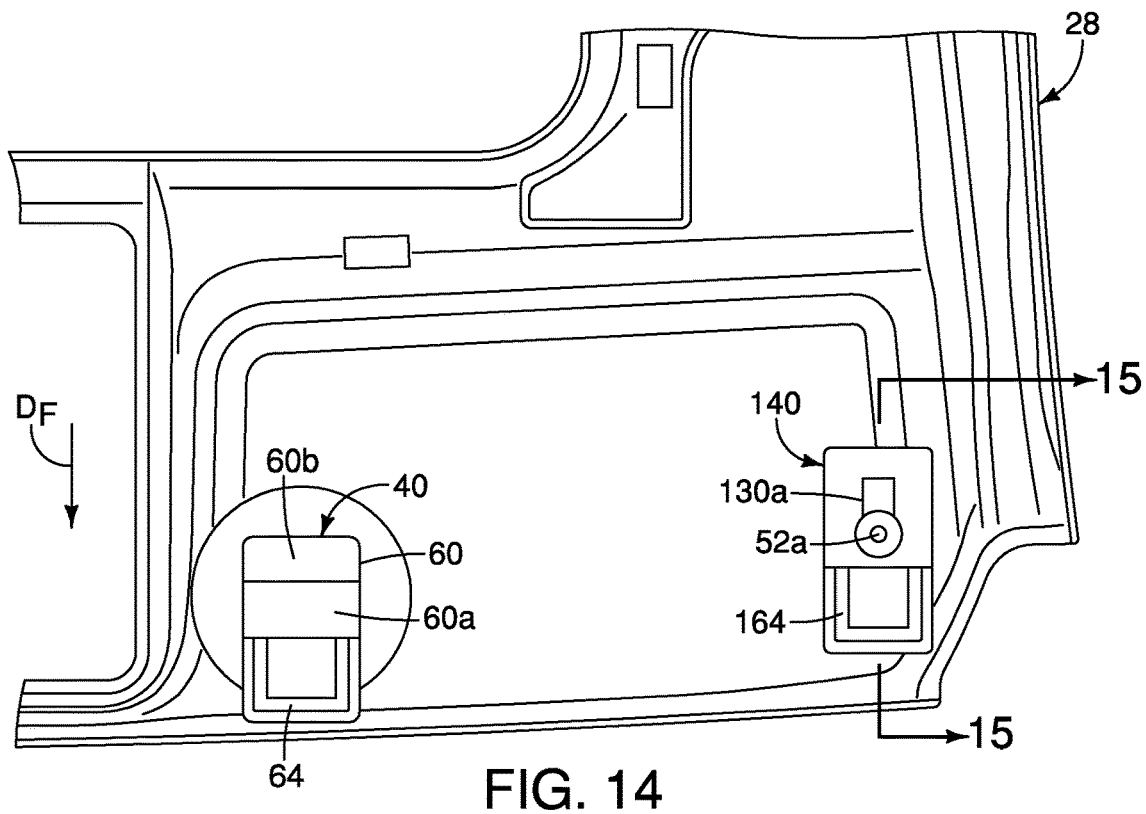
FIG. 14 is a top view of a portion of the headliner with the second energy absorbing structure of the sunvisor assembly installed to the headliner in accordance with the second embodiment.
Figure 15:
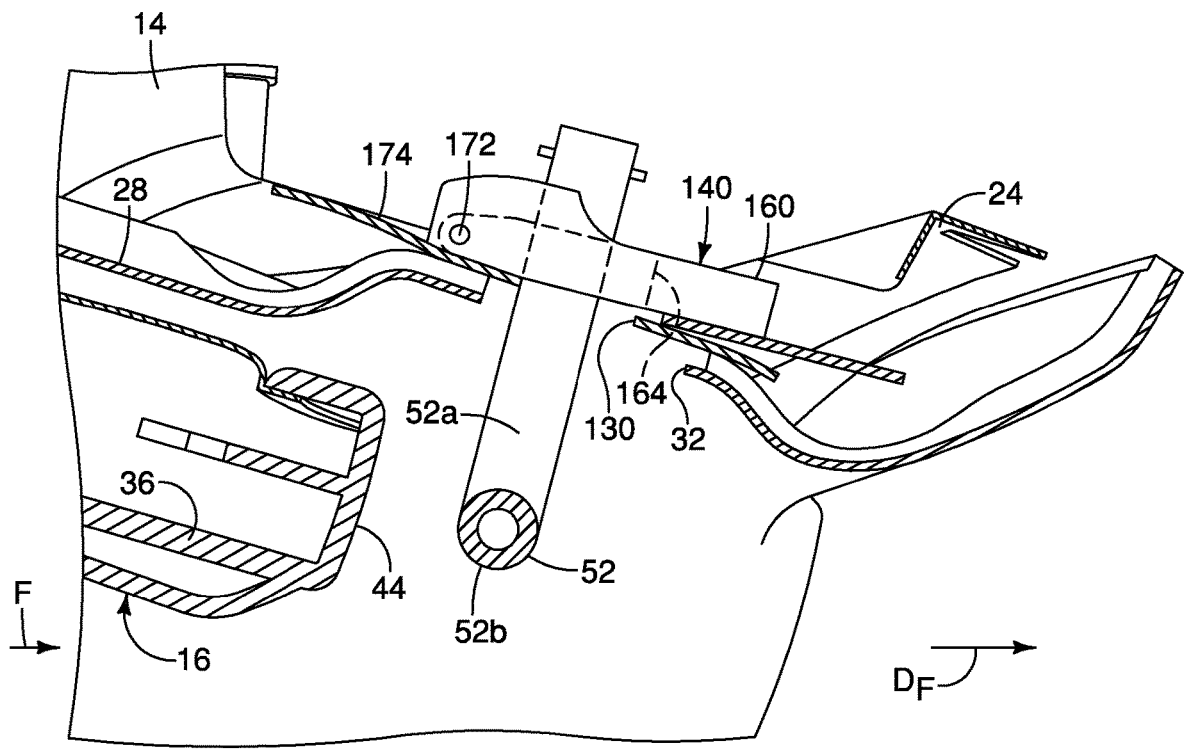
FIG. 15 is a cross-sectional side view of a portion of the sunvisor assembly taken along the line 15-15 in FIG. 14 showing further details of a housing and a pivoting member within the housing of the energy absorbing structure and the sunvisor assembly in an at rest orientation in accordance with the second embodiment.

The sunvisor assembly 116 has all of the features of the sunvisor assembly 16 of the first embodiment, including the sunvisor panel 36, the L-shaped shaft 52, the roof structure 14, the headliner 28, etc. In the second embodiment, the sunvisor 116 further includes an energy absorbing structure 140 that is installed over an opening or slot 130 as shown in FIGS. 13 and 15.

The energy absorbing structure 140 includes a housing 160, the biasing member (not shown) of the first embodiment and further includes a pivoting member 164. The upper end or first portion 52a of the L-shaped shaft 52 is supported by the pivoting member 164 of the energy absorbing structure 140. The pivoting member 164 has pivot pins 170 that extend through pivot openings in the housing 160. The pivoting member 164 fully supports the first portion 52a of the L-shaped shaft 52 for pivotal movement about the axis $A_1$. Further, since the pivoting member 164 can pivot relative to the housing 160, the L-shaped shaft 52 and the axis $A_1$ pivot with the pivoting movement of the base member 150.

Figure 16:
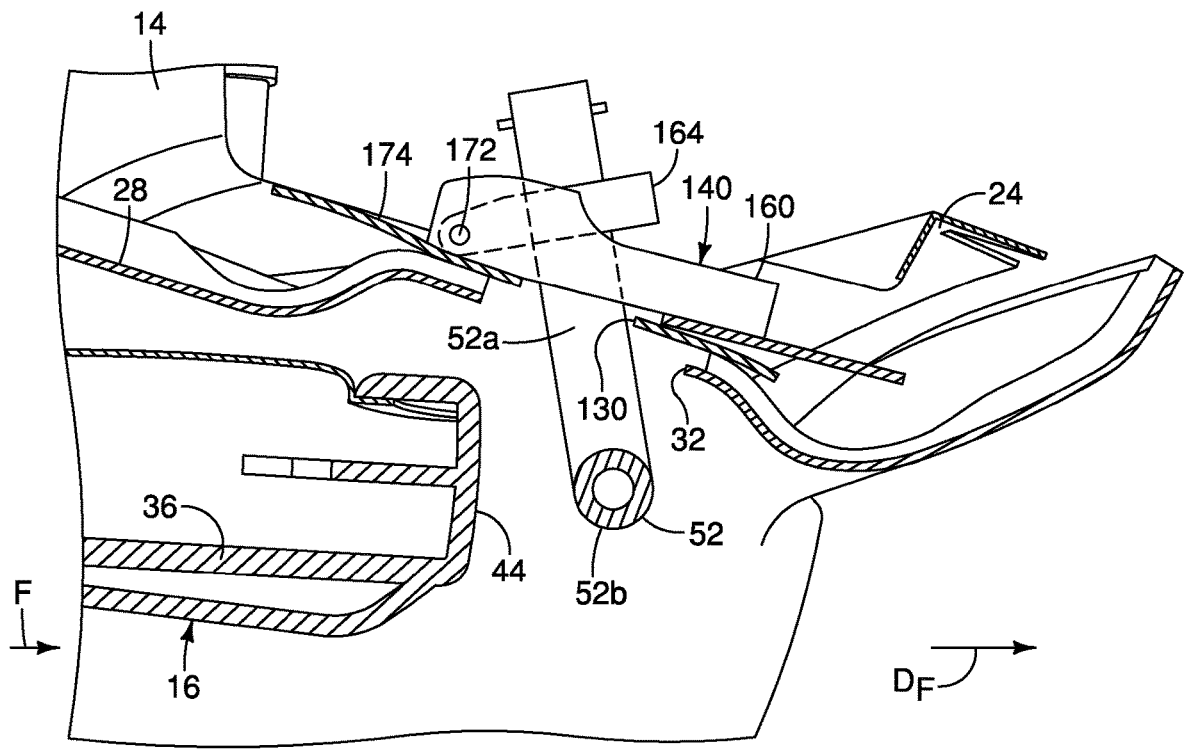
FIG. 16 is a cross-sectional side view similar to FIG. 15 showing the pivoting member and the L-shaped shaft member pivoted forward and upward relative the housing and the headliner in accordance with the second embodiment.

More specifically, in response to an object represented by arrow F moving rapidly forward and contacting the sunvisor panel 36, the sunvisor panel 36 moves the L-shaped shaft 52 forward and upward as the pivoting member 164 pivots about the pivot pins 72 against the force of the spring (not shown). FIG. 15 shows the pivoting member 164 and L-shaped shaft 52 in an at rest orientation. FIG. 16 shows the pivoting member 164 pivoted forward and upward in response to the object F transferring forward momentum (force) to the sunvisor panel 36.

The energy absorbing structure 140 is configured to absorb forward energy resulting from forward energy being applied to the first end 44 of the sunvisor panel 36 by the object F in a manner consistent with the in the first embodiment. Specifically, movement of the sunvisor panel 36 in the forward direction $D_F$ from forward energy or momentum is transmitted through the L-shaped shaft 52 to the pivoting member 164.

The vehicle body structure includes features, devices and structure are conventional components that are well known in the art. Since these features, devices and structure are well known in the art, these features, devices and structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle sunvisor assembly. Accordingly, these terms, as utilized to describe the present invention should be interpreted relative to a vehicle equipped with the vehicle sunvisor assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle sunvisor assembly, comprising:
    a support structure attached to a vehicle body structure adjacent to a first area of a windscreen of the vehicle body structure;
    a sunvisor panel having a first end and a second end, the first end being supported by the support structure for pivotal movement about an upright axis and movement about an offset axis that is not parallel to the upright axis, the second end of the sunvisor panel having a first attachment end; and
    an energy absorbing structure installed to the vehicle body structure adjacent to a second area of the windscreen spaced apart from the first area, the energy absorbing structure having a housing and a downwardly extending projection, the housing being fixed to a roof structure above a headliner and the downwardly extending projection being substantially located below the headliner, the downwardly extending projection being pivotal relative to the housing via a pivot structure above the headliner, the downwardly extending projection having a second attachment end that aligns with the first attachment end such that with the first attachment end of the sunvisor panel pivoted to the second attachment end, the first attachment end releasably attaches to the second attachment end,
    the second attachment end being located at a lower end of the downwardly extending projection, and the pivot structure being located at an upper end of the downwardly extending projection, and with the first attachment end secured within the second attachment end the energy absorbing structure is configured to absorb energy and pivot upward and forward in response to an object contacting and moving the sunvisor panel in a forward direction, transferring movement energy to the second attachment end via the first attachment end causing the downwardly extending projection to pivot about the pivot structure.

2. The vehicle sunvisor assembly according to claim 1, wherein
    the pivot structure of the downwardly extending projection is engaged with a rearward portion of the housing such that the downwardly extending projection moves forward and upward in response to forward movement force being applied thereto.

3. The vehicle sunvisor assembly according to claim 2, wherein
    the energy absorbing structure includes a biasing member located within the housing, the biasing member urging the downwardly extending projection to a lower orientation.

4. The vehicle sunvisor assembly according to claim 3, wherein
    the biasing member is a coil spring.

5. The vehicle sunvisor assembly according to claim 1, wherein
    the support structure includes a shaft member having a first shaft portion and a second shaft portion, the first shaft portion extending into the support structure and being pivotal about an upright axis that extends through the support structure, the second shaft portion being angularly offset from the first shaft portion, the second shaft portion extending into the first end of the sunvisor panel such that the sunvisor panel pivots about the second shaft portion.

6. The vehicle sunvisor assembly according to claim 5, wherein
    the first shaft portion and the second shaft portion define an overall L-shape.

7. The vehicle sunvisor assembly according to claim 5, wherein
    the second shaft portion defines an offset axis about which the sunvisor panel pivots, the upright axis and the offset axis defining an angle therebetween.

8. The vehicle sunvisor assembly according to claim 7, wherein
    the angle is between 80 and 100 degrees.

9. The vehicle sunvisor assembly according to claim 8, wherein
   the angle is 90 degrees.
10. The vehicle sunvisor assembly according to claim 7, wherein
   the first attachment end is a pivot pin and the second attachment end is a slot formed in the downwardly extending projection.
11. The vehicle sunvisor assembly according to claim 10, wherein
   the pivot pin is aligned with the offset axis.
12. The vehicle sunvisor assembly according to claim 1, wherein
   the first attachment end is a pivot pin and the second attachment end is a slot formed in the downwardly extending projection.
13. The vehicle sunvisor assembly according to claim 1, wherein
   the first attachment end is a magnetically susceptible pivot pin and the second attachment end includes a magnet within the downwardly extending projection.
14. The vehicle sunvisor assembly according to claim 1, wherein
   the headliner is installed along an interior side of the roof structure, the energy absorbing structure being fixed to the roof structure above the headliner.

\* \* \* \* \*